United States Patent
Chien et al.

(10) Patent No.: US 7,196,693 B2
(45) Date of Patent: Mar. 27, 2007

(54) LIGHTING KEYBOARD AND LIGHTING MODULE THEREOF

(75) Inventors: Chung-Chi Chien, Taipei (TW); Szu-Jung Peng, Taipei (TW); Feng-Cheng Chang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 530 days.

(21) Appl. No.: 10/734,755

(22) Filed: Dec. 12, 2003

(65) Prior Publication Data

US 2005/0128188 A1    Jun. 16, 2005

(51) Int. Cl.
*G09G 5/00* (2006.01)
(52) U.S. Cl. ...................... 345/168; 345/169
(58) Field of Classification Search ................ 345/156, 345/168–170; 362/84, 85; 341/22; 340/407.1; 708/142
See application file for complete search history.

(56) References Cited

U.S. PATENT DOCUMENTS

| | | | | |
|---|---|---|---|---|
| 5,097,396 A | * | 3/1992 | Myers | 362/551 |
| 5,397,867 A | * | 3/1995 | Demeo | 200/5 A |
| 6,023,277 A | * | 2/2000 | Osaka et al. | 345/419 |
| 6,179,432 B1 | * | 1/2001 | Zhang et al. | 362/84 |
| 6,609,805 B1 | * | 8/2003 | Nelson | 362/30 |
| 6,776,497 B1 | * | 8/2004 | Huppi et al. | 362/85 |
| 6,897,912 B2 | * | 5/2005 | Kawakami et al. | 349/61 |
| 6,987,466 B1 | * | 1/2006 | Welch et al. | 341/22 |
| 2003/0090885 A1 | * | 5/2003 | Hsu | 362/24 |
| 2005/0157971 A1 | * | 7/2005 | Juijve et al. | 385/12 |

* cited by examiner

*Primary Examiner*—Ricardo Osorio
(74) *Attorney, Agent, or Firm*—Birch, Stewart, Kolasch & Birch, LLP.

(57) ABSTRACT

A lighting keyboard and lighting module for a keyboard is disclosed. The lighting module comprises a light source, a backlight plate having a surface with light-reflective protrusions and a light-reflecting plate. In one embodiment, the thickness of the backlight plate varies linearly and the light source is located on the thicker side of the backlight plate. The light-reflecting plate reflects light beams reflected from the surface with light-reflective protrusions of the backlight plate and renders the keyboard illuminated.

25 Claims, 3 Drawing Sheets

LIGHTING KEYBOARD AND LIGHTING MODULE THEREOF

BACKGROUND OF THE INVENTION

1. Field of the Invention

The present invention relates to a lighting keyboard and lighting module thereof, and more particularly to a lighting keyboard and lighting module thereof which are low cost and easy for production.

2. Description of the Related Art

Referring to FIG. 1, a top view of a conventional lighting module for a keyboard is shown. The lighting module utilizes light-emitting diodes 102 as a light source, a plurality of optical fibers 104 to transmit light which are arranged under the keyboard 106. The light-emitting diodes 102 are controlled by a circuit board to provide light beams transmitted by the optical fibers 104 to illuminate the keypads 108 of the keyboard 106. However, the use of optical fibers would increase the production cost since the optical fibers are expensive. Moreover, the large number, tiny size and high-density arrangement of the optical fibers further increase the complexity and cost of the keyboard production.

Referring to FIG. 2, another conventional lighting module for a keyboard is shown. This lighting module utilizes an electroluminescent 204 which is inserted into the module of the keyboard to light the keyboard. As shown in the figure, the electroluminescent 204 is disposed between an aluminum plate 206 of the keyboard and a upper housing 202 of the keyboard, wherein the aluminum plate 206 has a circuit board and a plurality of keypads 208 thereon. The keyboard is lightened by the light from the electroluminescent 204 through the exits of the upper housing 202. The keyboard may be lightened by the light from the electroluminescent 204 through the exits of the upper housing 202 and the keypads 208. The use of the electroluminescent 204 would increase the complexity of the keyboard production and keyboard components because the upper housing 202 and the keypads 208 must be redesigned or at least modified in order to accommodate the electroluminescent 204. The use of the lighting module shown in FIG. 2 will also increases the complexity and cost of the keyboard production and further has drawbacks such as assembling and disassembling inconvenience.

Thus it is necessary to provide a new lighting module and lighting keyboard to resolve the drawbacks of the conventional lighting keyboard set forth. It is towards those goals that the present invention is specifically directed.

SUMMARY OF THE INVENTION

It is therefore an object of the invention to provide a low production cost lighting keyboard and a lighting module thereof.

It is another object of this invention to provide a lighting keyboard and lighting module thereof which are easy to be manufactured.

It is a further object of this invention to provide a lighting keyboard and lighting module thereof which are easy to assemble and disassemble.

To achieve these objects, and in accordance with the purpose of the invention, the invention provides a lighting module of a keyboard. In one embodiment, the lighting module comprises at least one light source, a light guide having a light-scattering surface and a reflector disposing under the light guide. The light source is located on a first side of the light guide and the light-scattering surface scatters light beams from the light source. The reflector reflects the light beams from the light-scattering surface to illuminate a keyboard. In one embodiment of the light guide, the light guide has a thickness which decreases linearly from the first side of the light guide, and the light-scattering surface has a plurality of light-scattering protrusions having a density decreasing from the first side of the light guide. The lighting module can further include a second light source located on a second side of the light guide opposite to the first side of the light guide, and the light guide has a constant thickness, and the light-scattering surface has a plurality of light-scattering protrusions having a constant density.

The invention also provides a lighting keyboard. In one embodiment of this invention, the lighting keyboard comprises a keyboard and a lighting module disposed under the keyboard comprising at least one light source, a light guide having a light-scattering surface and a reflector disposing under the light guide. The light source is located on a first side of the light guide and the light-scattering surface scatters light beams from the light source. The reflector reflects the light beams from the light-scattering surface to illuminate the keyboard. In one embodiment of the light guide, the light guide has a thickness which decreases linearly from the first side of the light guide, and the light-scattering surface has a plurality of light-scattering protrusions having a density decreasing from the first side of the light guide. The lighting keyboard can further comprise a second light source located on a second side of the light guide opposite to the first side of the light guide, and the light guide has a constant thickness, and the light-scattering surface has a plurality of light-scattering protrusions having a constant density.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENT

It is to be understood and appreciated that the process steps and structures described below do not cover a complete process flow and structure. The present invention can be practiced in conjunction with various fabrication techniques that are used in the art, and only so much of the commonly practiced process steps are included herein as are necessary to provide an understanding of the present invention.

The present invention will be described in detail with reference to the accompanying drawings. It should be noted that the drawings are in greatly simplified form and they are not drawn to scale. Moreover, dimensions have been exaggerated in order to provide a clear illustration and understanding of the present invention.

Figure 1:
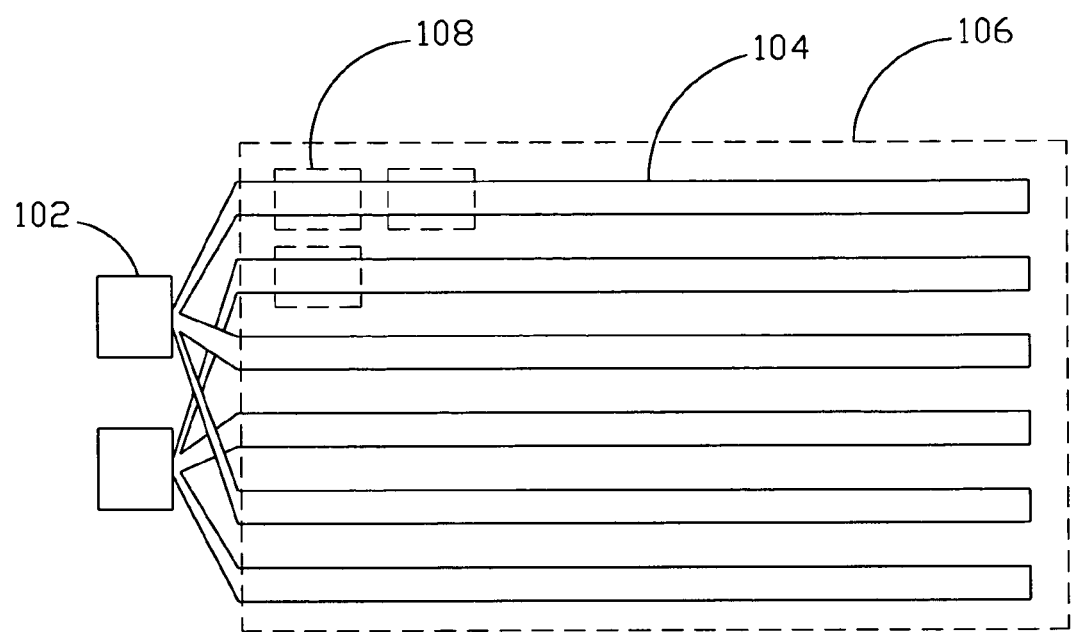
FIG. 1 shows a top view of a conventional lighting module for a keyboard.
Figure 2:
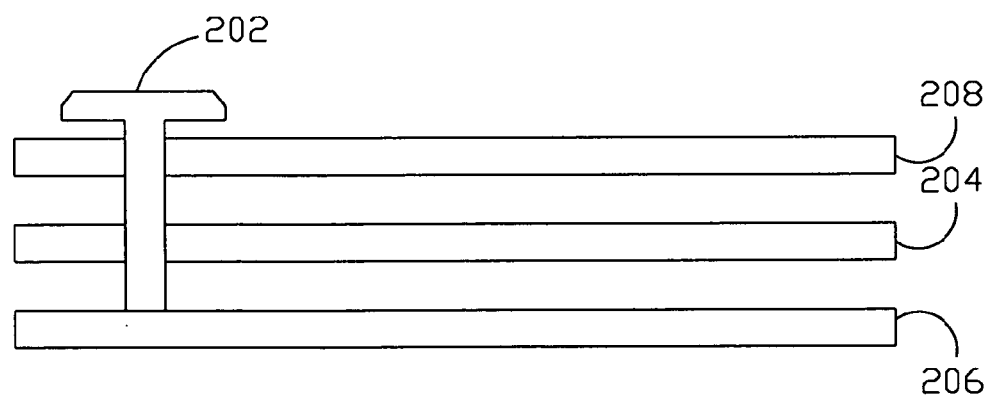
FIG. 2 shows another conventional lighting module for a keyboard.
Figure 3A:
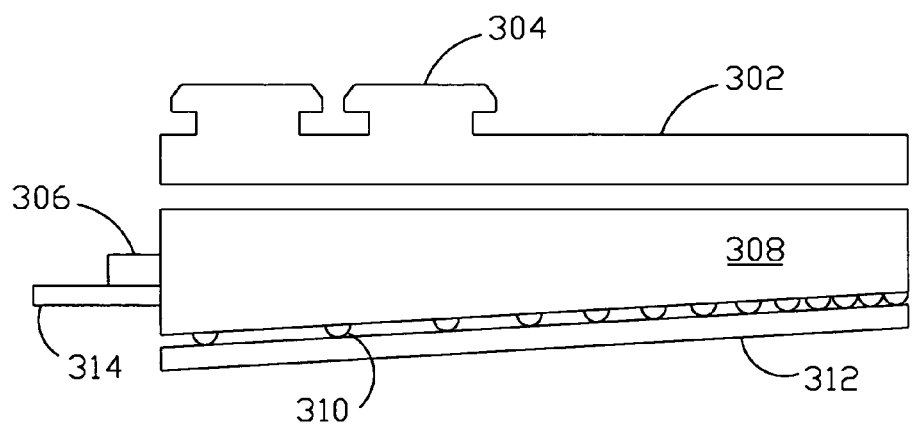
FIG. 3A shows one embodiment of a lighting keyboard and a lighting module thereof of the claimed invention.
Figure 3B:
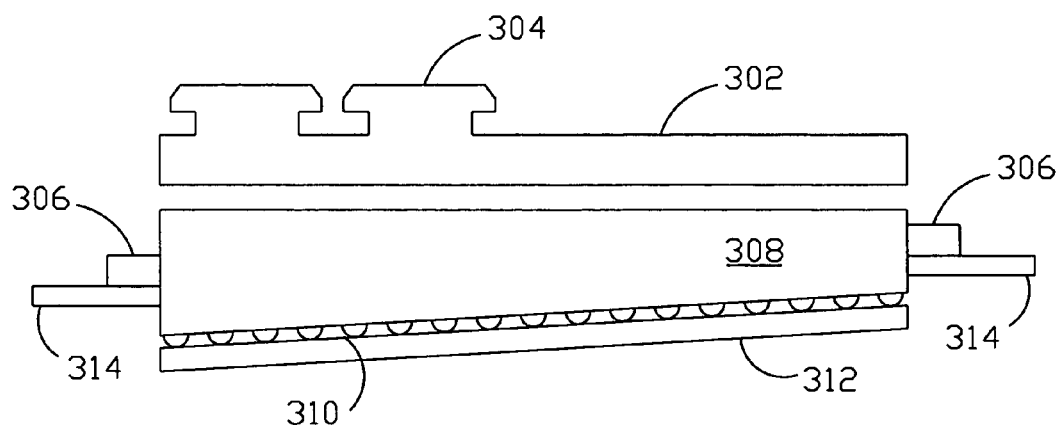
FIG. 3B shows another embodiment of a lighting keyboard and a lighting module thereof of the claimed invention.

Referring to FIG. 3A, one embodiment of a lighting keyboard and a lighting module thereof of the claimed invention is shown. In this embodiment of a lighting module of the claimed invention, the lighting module comprises a light source 306, a light guide 308 having a light-scattering surface and a reflector 312. In one embodiment, the light guide 308 has a thickness which varies linearly and the light source 306 is located on the thicker side of the light guide 308 (wedge shape). The reflector 312 reflects light scattered from the light-scattering surface of the light guide 308 to lighten a keyboard 302. The light source 306 comprises light-emitting diodes or other light source. The light guide 308 comprises a light guide of a liquid crystal display panel, but not limited to the light guide used in a liquid crystal display panel. The reflector 312 comprises a reflective plate with a smooth and flat surface, such as a white plastic plate/sheet. In one embodiment, the light-scattering surface of the light guide 308 comprises a plurality of light-scattering protrusions 310 and the density of the light-scattering protrusions 310 varies with the thickness of the light guide 308. The density or number of the light-scattering protrusions 310 on the thicker side of the light guide 308 is smaller than the density or number of the light-scattering protrusions 310 on the thinner side of the light guide 308 so that the lighting module can generate a uniform illumination. FIGS. 3A and 3B show embodiments of the light-scattering protrusions 310 having a shape of hemisphere. The shape of the light-scattering protrusions 310 is not limited to a hemisphere, the light-scattering protrusions 310 can also have other shapes such as a cube. The light source 306 is controlled by a control circuit 314 which is formed on a printed circuit board.

In another embodiment, as shown in FIG. 3B, the light sources 306 are located on the two side of the light guide 308 and the density or arrangement of the light-scattering protrusions 310 is constant or uniform. The material of the light guide 308 comprises acrylic resin or poly(methyl methacrylate, PMMA) and other transparent polymer or materials. The light-scattering protrusions 310 can be formed by printing and injection molding. The control circuit 314 is controlled and powered by a switch (not shown).

Figure 3C:
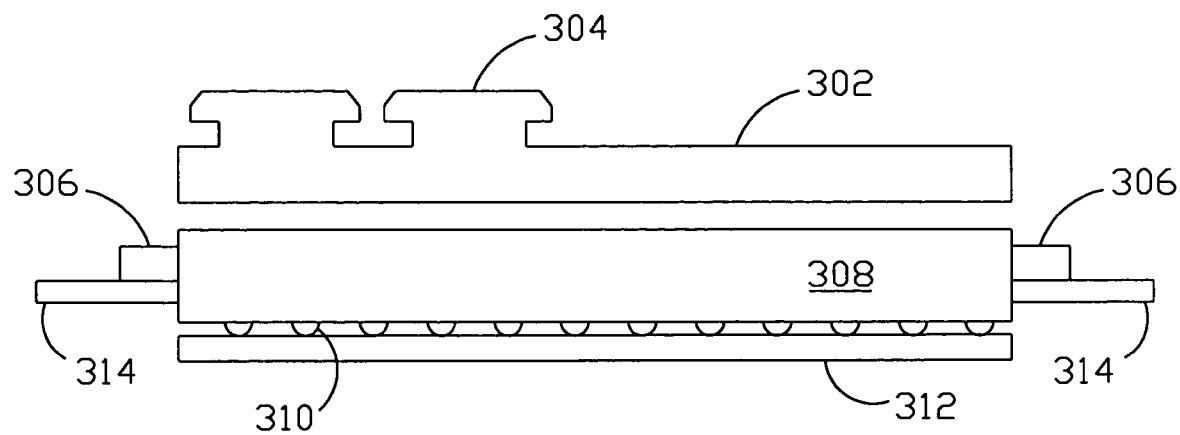
FIG. 3C shows another embodiment of a lighting keyboard and a lighting module thereof of the claimed invention.

In another embodiment, the thickness of the light guide 308 can be constant or non-linear. The density or arrangement of the light-scattering protrusions 310 can be constant or uniform, and the light sources 306 are located on the two sides of the light guide 308 as shown in FIG. 3C.

Figure 4:
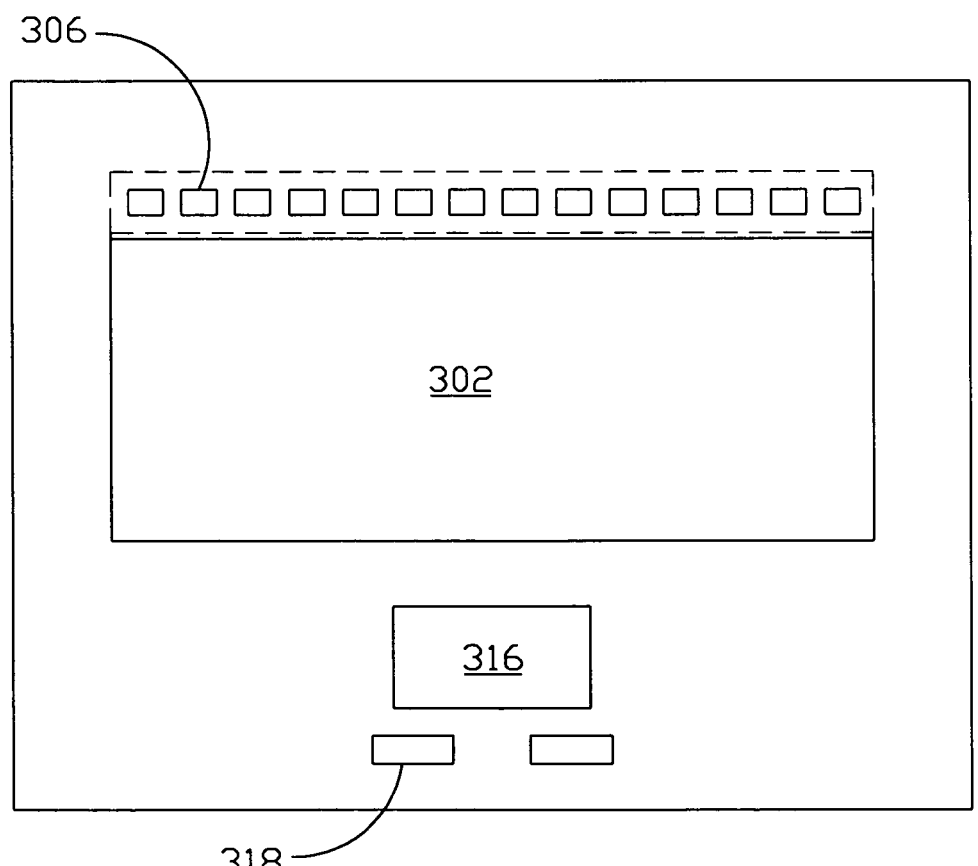
FIG. 4 shows a notebook personal computer having a lighting keyboard and a lighting module of the invention.

FIG. 4 shows a notebook personal computer having a lighting keyboard and a lighting module of the invention, wherein the light source 306 is located on one side of the keyboard 302. FIG. 4 also shows a touch pad 316 and keypads 318. The lighting keyboard of the invention can be an independent keyboard device as an input apparatus for desktop personal computers or personal digital assistant devices or a built-in input device for a notebook personal computer.

The invention combines a light source comprising light-emitting diodes, a light guide and a reflector to form a lighting module which can be disposes on the backside of a keyboard. The lighting module is easy and convenient to assemble and disassemble. In one embodiment of the invention, the thickness of the light guide varies linearly and the light source is located on the thicker side of the light guide. The light guide has a light-scattering surface having a plurality of light-scattering protrusions to scatter the light beam from the light source. The density or arrangement of the light-scattering protrusions is higher on the thinner side of the light guide so that a uniform illumination can be generated. The light-scattering protrusions face the reflector and scatter the light beam from the light source to the reflector. The reflector reflects the light beam through the light guide into the keyboard and illuminate the keypads. In another embodiment, two light sources are located on the two sides of the light guide having a wedge shape and the density or arrangement of the light-scattering protrusions are constant or uniform. In another embodiment, the thickness of the light guide is constant and two light sources are located on the two sides of the light guide and the density or arrangement of the light-scattering protrusions are constant or uniform.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A lighting module of a keyboard, said lighting module comprising:
    at least one light source;
    a light guide having a light-scattering surface, said light source locating on a first side of said light guide and said light-scattering surface scattering light beams from said light source, wherein said light guide has a thickness which decreases linearly from said first side of said light guide, and said light-scattering surface has a plurality of light-scattering protrusions having a density decreasing from said first side of said light guide; and
    a reflector disposing under said light guide, said reflector reflecting said light beams from said light-scattering surface to illuminate a keyboard.

2. The lighting module of a keyboard according to claim 1 further comprising a second light source located on a second side of said light guide opposite to said first side of said light guide.

3. The lighting module of a keyboard according to claim 1, wherein said light source comprises light-emitting diodes.

4. The lighting module of a keyboard according to claim 1, wherein said light guide has a thickness which decreases linearly from said first side of said light guide.

5. The lighting module of a keyboard according to claim 1, wherein said light-scattering surface has a plurality of light-scattering protrusions.

6. The lighting module of a keyboard according to claim 5, wherein said light-scattering protrusions have a shape of hemisphere.

7. The lighting module of a keyboard according to claim 5, wherein said light-scattering protrusions have a shape of cube.

8. The lighting module of a keyboard according to claim 5, wherein said light-scattering protrusions are formed by printing.

9. The lighting module of a keyboard according to claim 5, wherein said light-scattering protrusions are formed by injection molding.

10. The lighting module of a keyboard according to claim 1 further comprising a second light source located on a second side of said light guide opposite to said first side of said light guide, and said light guide has a constant thickness, and said light-scattering surface has a plurality of light-scattering protrusions having a constant density.

11. The lighting module of a keyboard according to claim 1, wherein said light guide are made of poly(methyl methacrylate, PMMA).

12. The lighting module of a keyboard according to claim 1 further comprising a control circuit for controlling said light source.

13. A lighting module of a keyboard, said lighting module comprising:
   a light source;
   a light guide having a light-scattering surface and a thickness which decreases linearly from a first side of said light guide, said light source locating on said first side of said light guide and said light-scattering surface comprising a plurality of light-scattering protrusions having a density decreasing from said first side of said light guide to scatter light beams from said light source; and
   a reflector disposing under said light guide, said reflector reflecting said light beams from said light-scattering surface to illuminate a keyboard.

14. A lighting keyboard, said lighting keyboard comprising:
   a keyboard; and
   a lighting module disposed under said keyboard comprising:
   at least one light source;
   a light guide having a light-scattering surface, said light source locating on a first side of said light guide and said light-scattering surface scattering light beams from said light source, wherein said light guide has a thickness which decreases linearly from said first side of said light guide, and said light-scattering surface has a plurality of light-scattering protrusions having a density decreasing from said first side of said light guide; and
   a reflector disposing under said light guide, said reflector reflecting said light beams from said light-scattering surface to illuminate said keyboard.

15. The lighting keyboard according to claim 14, wherein said keyboard comprises a keyboard of a notebook personal computer.

16. The lighting keyboard according to claim 14, wherein said keyboard comprises an independent keyboard used in desktop personal computers.

17. The lighting keyboard according to claim 14, further comprising a second light source located on a second side of said light guide opposite to said first side of said light guide.

18. The lighting keyboard according to claim 14, wherein said light source comprises light-emitting diodes.

19. The lighting keyboard according to claim 14, wherein said light guide has a thickness which decreases linearly from said first side of said light guide.

20. The lighting keyboard according to claim 14, wherein said light-scattering surface has a plurality of light-scattering protrusions.

21. The lighting keyboard according to claim 20, wherein said light-scattering protrusions have a shape of hemisphere.

22. The lighting keyboard according to claim 20, wherein said light-scattering protrusions have a shape of cube.

23. The lighting keyboard according to claim 14 further comprising a second light source located on a second side of said light guide opposite to said first side of said light guide, and said light guide has a constant thickness, and said light-scattering surface has a plurality of light-scattering protrusions having a constant density.

24. The lighting keyboard according to claim 14, wherein said light guide are made of poly(methyl methacrylate, PMMA).

25. The lighting keyboard according to claim 14 further comprising a control circuit for controlling said light source.

* * * * *